United States Patent Office 3,431,399
Patented Mar. 4, 1969

3,431,399
HIGH AND LOW LIMIT TEMPERATURE CONTROL SYSTEM
Selby G. Venning, Roanoke, Va., assignor to General Electric Company, a corporation of New York
Filed Mar. 9, 1967, Ser. No. 626,654
U.S. Cl. 219—497    11 Claims
Int. Cl. H05b 1/02

ABSTRACT OF THE DISCLOSURE

This is a temperature control having a negative feedback signal applied to a summing junction, and a positive reference signal applied to the same summing junction. The one signal opposing the other signal will cause the junction to take on the polarity of the greater of the two signals, thereby controlling the application of power to a heating unit. By the addition of positive and negative signals of predetermined values to the summing junction and by timing the application of these signals, an alarm circuit can be energized when the negative feedback signal exceeds or is less than the combined signals of the reference signal and the additional positive or negative signals. This provides an alarm function when high or low limits of temperature, as provided by the addition of the negative and positive signals to the summing junction, are violated.

Background of the invention

In a system where temperature control of very close tolerance is required, such as is necessary in the processing of synthetic fibres, it frequently occurs that through malfunction of the machinery or breaking, or balling up, of the yarn temperatures, set by the control circuit, are exceeded beyond tolerable limits thereby resulting in unacceptable finished material.

It is, therefore, an object of this invention to provide a control for a heating unit which will indicate that temperatures of the processing machinery, as set by the temperature control, are exceeding acceptable limits.

For some products the tolerances may be greater than for others, hence it is possible that when temperature limits are exceeded the yarn thereby produced would be unacceptable for one application while still quite acceptable for another.

It is therefore another object of this invention to provide an alarm system where temperature excesses are indicated beyond different ranges of high and low limits.

Summary of the invention

The invention is directed to a summation circuit or system wherein a common junction is employed, together with signals of different polarity and varying magnitude applied to the junction in accordance with a predetermined program, thereby effecting an indication of the condition or a control of the source of one of the signals. A further modification of the system provides for the indication or control of a signal source over ranges of variation of the signal between different maximum and minimum limits.

Description of the preferred embodiment

Figure 1:
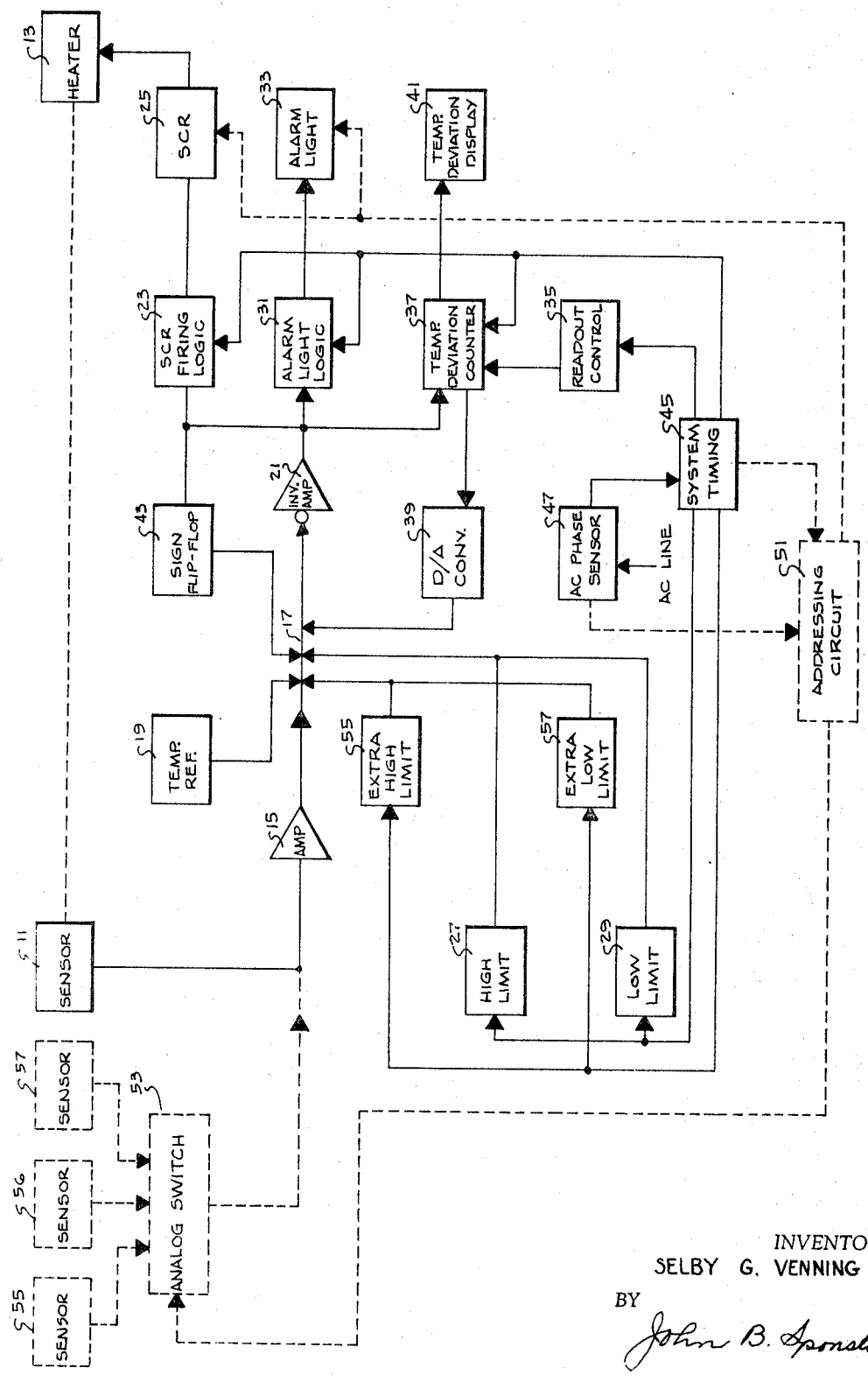
FIGURE 1 represents a block diagram of the relationship of the various functions which make up the heater control and high and low limit temperature alarm system.

In FIGURE 1 a heater element 13 is provided with a temperature sensor 11, such as a thermistor or the like. When voltage is applied to the heater element 13 and current is caused to flow, the temperature of the heater element increases. This increase is detected by the temperature sensor 11, which applies a signal of negative polarity through a buffer amplifier 15 to a summing junction 17. A setable temperature reference circuit 19 applies a positive signal to the summing junction 17. If the negative signal from the buffer amplifier 15 is greater than the positive signal from the reference circuit 19, the polarity of the summing junction 17 goes negative. If, however, the negative signal from the buffer amplifier 15 is smaller than the positive signal from the reference circuit 19 then the polarity of the summing junction 17 is positive. Either of these signals is applied to the input of an amplifier 21, which is a high gain inverting amplifier, and will produce a positive signal when its input signal is negative and a negative signal when the input signal is positive. A negative signal output from the inverting amplifier 21, applied to an SCR firing logic circuit 23 will cause the firing of an SCR 25 and hence the application of voltage to the heater element 13.

Limit indication through the use of alarm lights is provided through high and low temperature limit circuits 27 and 29, respectively, when temperature limits are exceeded. The high limit reference circuit 27 applies a positive signal to the summing junction 17 in addition to the positive signal from the temperature reference circuit 19 so that during a predetermined period of each cycle when the high limit reference is switched to apply this signal, the summing junction 17 will become more positive in polarity which can only be overcome by a more negative signal from the amplifier 15 as a result of a higher temperature. During the time that the temperature limit circuits 27 or 29 are switched in the circuit the SCR logic circuit is disconnected and the alarm light logic 13 is connected in its place. If the negative signal applied by the amplifier 15 is greater than the sum of the positive signals from temperature reference circuit 19 and high limit reference circuit 27, the resultant negative signal applied to the inverting amplifier 21 will cause this amplifier to apply a positive signal to the alarm light logic circuit thereby causing an alarm light 33 to be turned on.

The low limit check is operated in a similar manner; however, the signal from the low limit reference circuit 29 is negative and hence is subtracted from the positive signal derived from the temperature reference circuit 19 thereby making the net signal of the summing junction less positive. It will consequently require less of a negative signal from the amplifier 15 to overcome the lower positive polarity of the summing junction 17. If the signal derived from the amplifier 15 is more negative than the net output of the low limit circuit 29 combined with the temperature reference circuit 19, then the signal applied to the inverting amplifier 21 will be negative and will cause the amplifier to produce a positive signal. Switching within the alarm light logic 31 will cause the logic to accept either a positive signal during the high limit check or a negative signal during the low limit check. During the low limit check, the alarm light logic circuit is switched to accept only a negative signal, and therefore does not respond to the positive signal from the inverting amplifier 21. If, however, the temperature, detected by the sensor 11, is lower than the sum of the low limit reference circuit 29 output and the temperature reference circuit 19 output, the summing junction 17 will go positive and inverting amplifier 21 will invert this signal and apply the resulting negative signal to the alarm light logic circuit 31, where during the low limit check the alarm light will be turned on.

For certain operations it is advantageous to have in addition to the high and low limit temperature check an extra high and an extra low limit check. The two functions operate identically to the high and low limit temperature functions except the limits are set at higher and lower values.

During the extra high temperature check period the system timing circuit applies a signal to an extra high limit temperature reference circuit 55, which then applies a positive signal to the summing junction 17 in a similar manner as described above for the high limit temperature check.

During the low limit temperature check, the system timing circuit 45 causes the extra low limit temperature reference circuit 57 to apply a negative signal to the summing junction 17, similar to the method used in the low limit temperature check.

The operator may display the actual temperature deviation from the set temperature reference by activating a readout control 35 which will start a temperature deviation counter 37, counting pulses received from a pulse generator in the timing system 45. The output of the counter is applied to a digital to analog converter 39 which converts the pulses to a positive signal of increasing value with each additional pulse. This resultant signal is applied to the summing junction 17 where it will oppose the negative signal derived from the amplifier 15. Thus, as the summing junction 17 becomes more positive with each pulse, the output from the inverting amplifier 21 will become more negative until the positive signal from the digital to analog converter 39 overcomes the negative signal from the temperature sensor at which time the inverting amplifier 21 will change state and cause the counter 37 to turn off. Every pulse which is applied to the digital to analog converter 39 is also applied to a temperature deviation display unit 41 which at the time when the counter 37 is stopped will display a total number of pulses produced, hence representing the deviation from temperature set by the temperature reference circuit 19. Described above is the procedure used for producing a display when the temperature checked is higher than that set by the reference circuit 19.

For checking the temperature which is lower than that set by temperature reference circuit 19, one additional step is required. If the temperature is below the level set by the temperature reference circuit 19, the summing junction having a negative polarity will cause a flip-flop 43 to apply a negative signal equivalent to 15 counts of the counter to the summing junction. The counter will now start to count up from this —15 count level and record the inverse of the total number of pulses necessary to bring the potential of the summing junction to zero in the temperature deviation display unit 41. For example, if the temperature were 8 degrees below the temperature set in temperature reference circuit 19, then the flip-flop 43 would cause a negative signal representing —15 degrees to be applied to the summing junction 17. The counter would then start to count and after 7 counts would reach the point where the summing junction polarity would cause the inverting amplifier 21 to change its state, thus turning off the counter. The sign flip-flop 43 now causes the inverse of the contents of the counter to be applied to the display unit 41. This is exactly 8, representing the temperature deviation from the set reference circuit 19.

The timing involved to perform the various functions such as firing the SCR's and checking the high and low limits and readout of temperature deviations is performed by a system timing circuit 45 which is pulsed by an AC phase sensor circuit 47 at the beginning of each half cycle of the AC supply.

As the AC cycle passes through ZERO an oscillator in the system timing circuit is inhibited for a short period of time to allow for the switching and settling of the various components throughout the circuit. At the end of the settling period, the inhibiting signal is removed and the oscillator resumes its production of pulses. The first pulse is used to interrogate the temperature sensor 11 and to connect the SCR firing logic circuit 23 to the output of inverting amplifier 21. If necessary, the SCR 25 will then be fired, causing the heater element 13 to be energized. There is then another short period during which the oscillator is inhibited and during which time the circuit is modified from the SCR firing logic circuit 23 to the alarm light logic circuit 31. If the half cycle involved is of positive polarity, the high limit reference circuit 27 is connected to the summing junction 17. If, however, the half cycle involved is of negative polarity the low limit reference circuit 29 is connected to the summing junction 17. There is thus a definite period set aside for the firing of the SCR and for the interrogation of the high limit reference circuit 27 and for the low limit reference circuit 29. Readout of the temperature occurs during the same period which is set aside for the checking of high and low limits. When the readout control is actuated either manually or automatically over fixed intervals of time, the checking of high and low limits is suspended for the rest of the duration of that half cycle during which the readout control 35 is actuated. The temperature deviation counter 37 requires about 400 microseconds to process the information to be accepted by the temperature deviation display unit; and therefore if the readout control circuit is actuated less than 400 microseconds before the end of the half cycle period action of the display is held over until the next half cycle.

While what has been described in the system for heating and checking the high and low limits of temperature of one heater unit, the system is intended to be used with many separate units, and to accomplish this the timing cycles are shortened to accommodate the number of heaters involved. A three phase system, of course, could accommodate three times as many heating units as a single phase system when the time of interrogation of the temperature sensors in each of the three phases is confined to not more than 60° of each half cycle.

Figure 2:
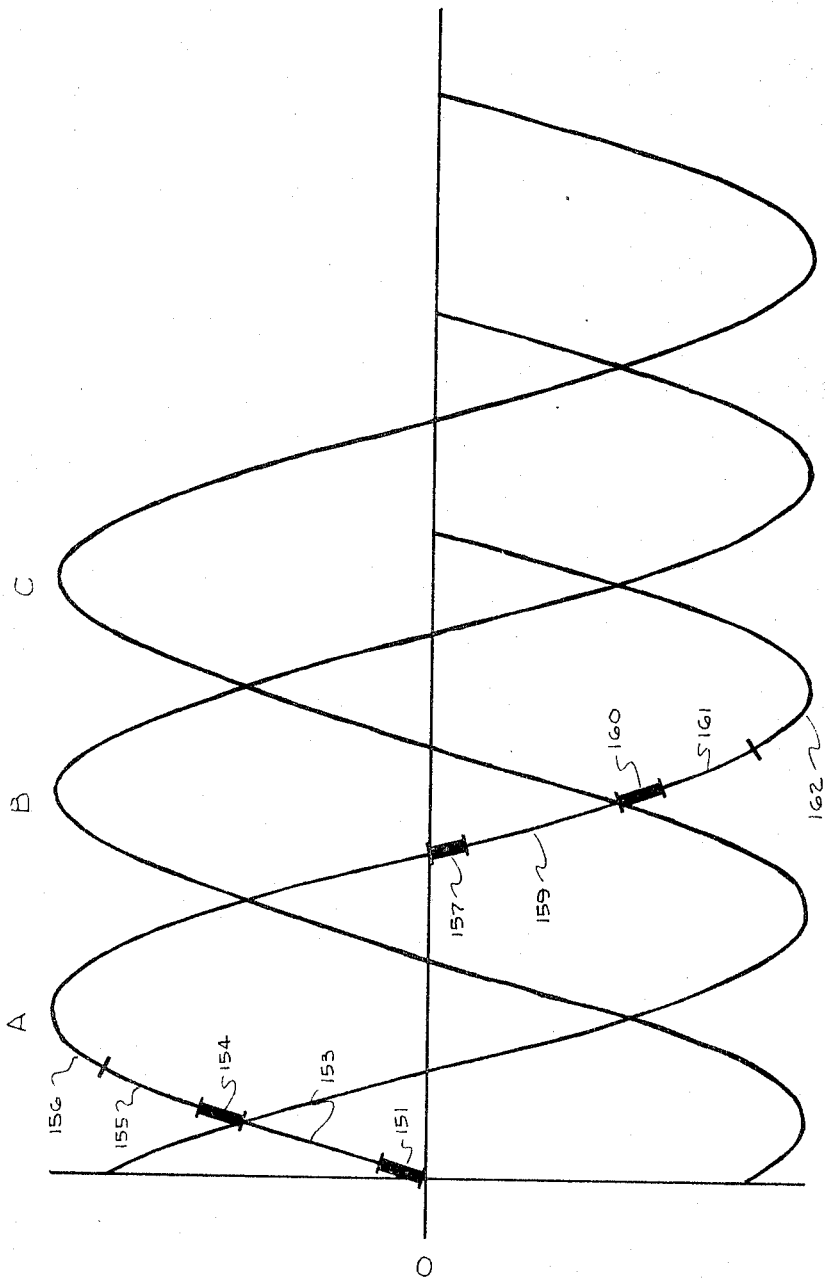
FIGURE 2 shows a timing chart of the various functions which are performed during the timing cycle.

Referring now to FIGURE 2 a three phase arrangement of the timing cycle shows phase A as it passes through ZERO with the short period of time 151 used for settling of the components in the system. This period is followed by a period 153 during which the temperature sensor is interrogated; and if necessary, the SCR is fired. Period 154 is a small time during which the oscillator is inhibited to allow switching of the alarm circuit and the high limit circuit and to allow the system components to settle. This is followed by a period 155 during which the high limit of the temperature of the heater is checked. During the rest 156 of the positive half cycle of phase A, the timing is switched to another phase (which is passing through ZERO) to perform the same steps as performed in phase A.

As phase A passes through ZERO on the negative side of the cycle there again is a short period 157 during which the oscillator is inhibited and the system is switched so that during the next period 159 the temperature sensor is interrogated and the SCR is fired, if so required. Period 160 provides time for switching and settling of the components in the system so that during period 161 the low limit of the heater may be checked after which the system is switched to another phase for the remaining portion 162 of the negative half of the cycle of phase A. Switching periods and periods for firing the SCR's and checking of high and low limits in phases B and C are identical to those of phase A, each occupying a total of 60° of phase angle of each half cycle.

Signals from the AC phase sensor 47 and the system timing circuit 45 would then have to be applied to an addressing circuit 51, shown in dashed lines in FIG. 1.

which in turn applies the necessary signals to a switching system 53 and SCR's 25 and alarm lights 33. The analog switch 53 then in turn connects the system to each of the temperature sensors 55, 56, and 57 which are representative of many other sensors, so that each of the heaters and corresponding temperature sensors are actuated at the appropriate time in the cycle. The total time allotted for interrogating every sensor in the system is slightly larger than required so that checking is repeated for some of the sensors before the system is switched to the next operation. This provides for a random starting point of SCR firing time so that the average ON period of all the heaters is the same.

Figure 3:
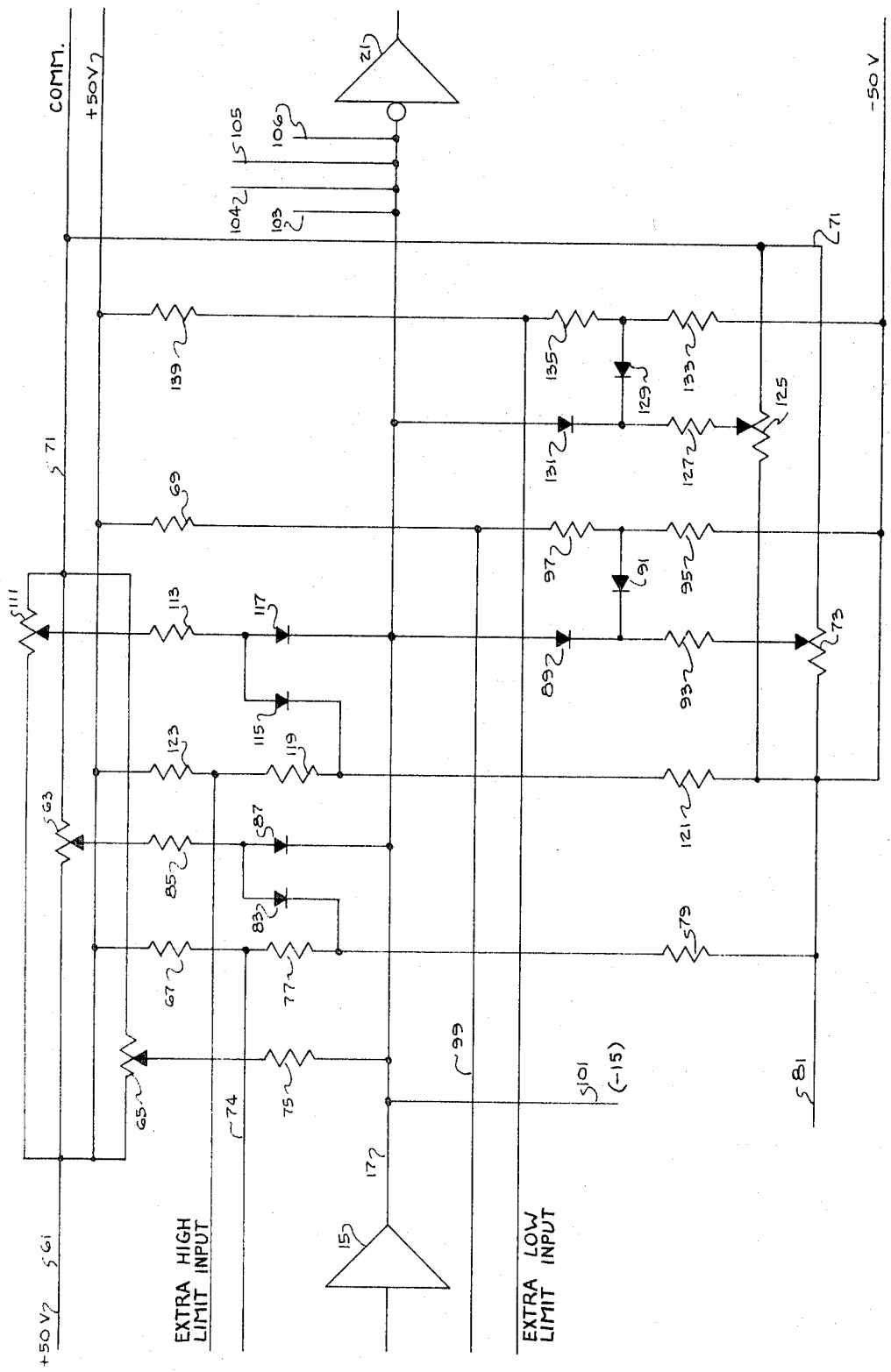
FIGURE 3 is a diagram showing the connections which make up the summing junction of the heating control.

In FIGURE 3 a positive bus 61 connects to a high limit reference potentiometer 63 and to a temperature reference potentiometer 65 and resistors 67 and 69 of the high and low limit temperature reference resistance bridges, respectively. The common bus 71 connects to the high and low limit temperature reference potentiometers 63 and 73, respectively, and to the temperature reference potentiometer 65. The slider connection of the temperature reference potentiometer 65 connects through resistor 75 to the summing junction 17.

Resistor 67 connects to the high limit input terminal 74 and connects through resistors 77 and 79 to the negative voltage bus 81. The cathode of diode 83 connects to the junction of resistors 77 and 79. The slider connection of high limit temperature potentiometer 63 connects through resistor 85 to the anodes of diodes 83 and 87, while the cathode of diode 87 connects to the summing junction 17. The anode of diode 89 is connected to the summing junction 17, and the cathode of diode 89 connects through resistor 93 to the slider of the low limit reference potentiometer 73, and to the cathode of diode 91. The anode of diode 91 connects through resistor 95 to negative bus 81 and through resistor 97 to the low limit input terminal 99 and to resistor 69. Other inputs to the summing junction are the negative potential input 101 from the sign flip-flop (not shown) which applies a negative signal equivalent to 15° to the summing junction 17 at the time when display of the temperature deviation is required and the input to the summing junction 17 from the temperature sensor amplifier 15 is less than the input from the temperature reference 65, as described above, and the positive inputs 103 from the A/D converter (not shown) which causes the temperature deviation counter (not shown) to register the temperature deviation of the heating unit (not shown). The summing junction is also connected to the inverting amplifier 21.

The extra high and extra low limit temperature reference circiuts are identical to the high and low limit temperature reference circuits described above. The extra high limit temperature circuit consists of a high limit potentiometer 111, connected between the positive bus 61 and the common bus 71. The slider of potentiometer 111 connects through resistor 113 to the anodes of diodes 115 and 117. The cathode of diode 117 connects to the summing junction and the cathode of diode 115 connects to the junction point of resistors 119 and 121. The positive bus 61 connects through resistor 123 to the extra high limit input terminal 125, and to resistor 119. The extra low limit temperature reference circuit consists of potentiometer 125 connected between negative bus 81 and common bus 71 and having it slider-connected through resistor 127 to the cathode of diodes 129 and 131. The anode of diode 129 connects through resistor 133 to the negative bus 81 and through resistor 135 to the extra high limit input terminal 137 and resistor 139. Resistor 139 connects to the positive bus 61.

The operation of the summing junction connections has been partially described in FIGURE 1, a more detailed description will follow. The negative voltage output of the temperature sensor (not shown) is applied to the input of the amplifier 15, where the signal is amplified and applied to the summing junction 17. The positive voltage signal from the temperature reference potentiometer 65 is applied through resistor 75 to the summing junction 17 where it is compared with the negative signal from the amplifier 15, causing the summing junction to be either positive or negative depending on the relative values of the inputs from the amplifier 15 and reference potentiometer 65. The high limit temperature reference bridge consisting of resistors 67, 77, and 79 is so constructed that the voltage at the cathode of diode 83 is sufficiently positive to back bias diode 83, when a positive signal is applied to input terminal 74. With diode 83 back biased, diode 87 is forward biased and passes current through resistor 85 to the summing junction 17. This current in addition to the current applied to the summing junction 17 by the temperature reference potentiometer 65 forms the positive signal in the summing junction against which the negative signal derived from the temperature sensor (not shown) amplified by amplifier 15, is checked, to determine if the temperature of the heating unit (not shown) exceeds the temperature limits set by the high limit temperature reference potentiometer 63. When the positive signal (digital ONE) applied to the high limit input terminal 74 is removed and a negative signal (digital ZERO) is applied, the voltage division arrangement of the high limit temperature reference bridge, consisting of resistors 67, 77, and 79, will cause diode 83 to be forward biased and conduct current away from the anode of diode 87, which then is caused to be reverse biased and prevents current from flowing into the summing junction 17. This occurs at the end of the high limit tempertaure check.

The low limit temperature check is performed in a similar manner except that a negative signal (digital ZERO) is required to be applied to the low limit input terminal 99, for the low limit resistor bridge, consisting of resistors 69, 97, and 95 to produce a voltage which will make the anode of diode 91 more negative than its cathode and thus back bias this diode, thereby causing diode 89 to conduct current away from the summing junction 17, hence making the junction more negative. The potential of the summing junction is then reduced by the amount as set by the low limit temperature reference potentiometer 73. The inputs 103–106 from the A/D converter apply positive signals to the summing junction 17 during the temperature deviation display period. The application of the signals is in a similar manner as that of the high limit temperature reference signals in that the analog signals applied to the summing junction 17 by the A/D converter (not shown) are digital weighted, hence a signal applied to terminal 103 has the weight of 1, and a signal applied to terminal 104 has the weight of 2. Signals on terminals 105 and 106 carry a weight of 4 and 8. If, therefore, positive signals were applied to terminals 103 and 106, the total weight of those two signals on the summing junction would be 9. The ratio of this number to degrees may be anything, depending on the application and hence may be one count for one degree of temperature or one count for a tenth of a degree of temperature, etc.

I claim:

1. In a control system for regulating the temperature of an electric heating device means for setting a potential value corresponding to a predetermined temperature, means for applying said potential value to said heating device, means for deriving a potential value corresponding to the temperature of said device, means for comparing the said values to derive a difference value, means for applying said difference value to said heating device, a source of recurrent pulses, means for controlling said source to provide pulses in proportion to said difference value, a digital to analog converter into which said pulses are fed, and means for coupling the output of said converter to said comparing means to regulate the said difference value.

2. The invention according to claim 1 wherein means is provided to reverse the polarity of the said set potential value.

3. The invention according to claim 1 wherein means is provided to reverse the polarity of the said derived potential value.

4. The invention of claim 1 with the further provision of means to derive a potential value corresponding to the temperature of said device having a polarity opposite of that of said set potential value.

5. The invention set forth in claim 1 with the further provision of means for adding a predetermined potential of the same polarity to the said set potential value.

6. The invention set forth in claim 1 with the further provision of means for adding a predetermined potential of the opposite polarity to the said set potential value.

7. The invention set forth in claim 1 with the further provision of means for adding a predetermined potential of the same polarity to the said derived potential value.

8. The invention set forth in claim 1 with the further provision of means for adding a predetermined potential of the opposite polarity to the said derived potential value.

9. The invention set forth in claim 1 wherein means is provided for recording the total number of pulses of said source over a predetermined period of time.

10. The invention according to claim 1 with the further provision of means for indicating a value equivalent to the total member of pulses of said source over a predetermined period of time.

11. The invention according to claim 1 wherein the coupling means includes means for transferring the output of said converter in opposed polarity to the larger of the said set potential value and the said derived potential value.

References Cited

UNITED STATES PATENTS

| | | | |
|---|---|---|---|
| 3,256,734 | 6/1966 | Storke | 219—497 |
| 3,300,622 | 1/1967 | Swain | 219—497 |
| 3,371,191 | 2/1968 | Seney | 219—497 |

BERNARD A. GILHEANY, *Primary Examiner.*

F. E. BELL, *Assistant Examiner.*